United States Patent
Uchiyama (10) Patent No.: US 8,532,345 B2
(45) Date of Patent: Sep. 10, 2013

(54) CAMERA AND IMAGE RECORDING PROGRAM PRODUCT

(75) Inventor: Yoji Uchiyama, Yokohama (JP)

(73) Assignee: Nikon Corporation, Tokyo (JP)

( * ) Notice: Subject to any disclaimer, the term of this patent is extended or adjusted under 35 U.S.C. 154(b) by 1046 days.

(21) Appl. No.: 12/289,246

(22) Filed: Oct. 23, 2008

(65) Prior Publication Data
US 2009/0110243 A1 Apr. 30, 2009

(30) Foreign Application Priority Data
Oct. 25, 2007 (JP) ................................ 2007-277699

(51) Int. Cl.
*G06K 9/00* (2006.01)

(52) U.S. Cl.
USPC ............................ 382/118; 382/190; 382/324

(58) Field of Classification Search
USPC .................................. 382/117, 118, 203, 190
See application file for complete search history.

(56) References Cited

U.S. PATENT DOCUMENTS

| | | | | |
|---|---|---|---|---|
| 5,646,388 A * | 7/1997 | D'Entremont et al. | ........ | 235/380 |
| 6,181,805 B1 * | 1/2001 | Koike et al. | .................... | 382/118 |
| 6,483,993 B1 | 11/2002 | Misumi et al. | | |
| 6,546,121 B1 * | 4/2003 | Oda | .............................. | 382/117 |
| 6,850,631 B1 * | 2/2005 | Oda et al. | ....................... | 382/117 |
| 6,882,741 B2 * | 4/2005 | Dobashi et al. | ............... | 382/118 |
| 7,146,027 B2 * | 12/2006 | Kim et al. | ...................... | 382/117 |
| 7,433,589 B2 * | 10/2008 | Odaka | ........................... | 396/155 |
| 2001/0028730 A1 * | 10/2001 | Nahata | ........................... | 382/117 |
| 2003/0206645 A1 * | 11/2003 | Okazaki et al. | ............... | 382/117 |
| 2006/0092292 A1 | 5/2006 | Matsuoka et al. | | |
| 2006/0139669 A1 * | 6/2006 | Takahashi | ....................... | 358/1.9 |
| 2006/0204106 A1 | 9/2006 | Yamaguchi | | |
| 2006/0285750 A1 * | 12/2006 | Okada et al. | ................... | 382/190 |
| 2007/0071361 A1 * | 3/2007 | Sanno | ............................ | 382/298 |
| 2007/0270182 A1 | 11/2007 | Gulliksson et al. | | |
| 2008/0037841 A1 * | 2/2008 | Ogawa | ........................... | 382/118 |
| 2008/0068486 A1 * | 3/2008 | Kusaka | ..................... | 348/333.02 |

FOREIGN PATENT DOCUMENTS

| | | |
|---|---|---|
| CN | 1288174 A | 3/2001 |
| CN | 1890955 A | 1/2007 |
| JP | A-2001-67459 | 3/2001 |
| JP | A-2001-148800 | 5/2001 |

(Continued)

OTHER PUBLICATIONS

Huang et al., "Eye Tracking with Statistical Learning and Sequential Monte Carlo Sampling", Dec. 15-18, 2003, ICICS-PCM 2003, pp. 1873-1878, Singapore.
Oct. 24, 2011 European Search Report issued in European Application No. EP 08 16 7568.8.
Japanese Office Action issued Nov. 22, 2011 for Japanese Patent Application No. 2007-277699 (with translation).

(Continued)

*Primary Examiner* — Vu Le
*Assistant Examiner* — Aklilu Woldemariam
(74) *Attorney, Agent, or Firm* — Oliff & Berridge, PLC (57) ABSTRACT

A camera includes: an image-capturing unit that captures images of a photographic subject by image sensors and creates image data of a plurality of shot images based on an instruction for continuous shooting by a user; an identification unit that performs, each time when image data of one shot image from among the plurality of shot images is created, a state judgment whether or not eyes of a person included in the photographic subject appearing in the one shot image are open and identifies image data of the one shot image as identified image data when a result of the state judgment is YES; and a recording unit that records the identified image data in a nonvolatile storage medium.

7 Claims, 6 Drawing Sheets (56) References Cited

FOREIGN PATENT DOCUMENTS

| | | |
|---|---|---|
| JP | A-2004-192551 | 7/2004 |
| JP | A-2004-320286 | 11/2004 |
| JP | A-2005-39365 | 2/2005 |
| JP | A-2005-45600 | 2/2005 |
| JP | A-2006-115406 | 4/2006 |
| WO | WO 2007/097777 A1 | 8/2007 |

OTHER PUBLICATIONS

Jul. 3, 2012 Office Action issued in European Patent Application No. 08 167 568.8.

Aug. 15, 2012 Office Action issued in Chinese Patent Application No. 200810169103.5 (with translation).

Feb. 18, 2013 Office Action issued in Chinese Patent Application No. 200810169103.5 (with translation).

* cited by examiner

CAMERA AND IMAGE RECORDING PROGRAM PRODUCT

INCORPORATION BY REFERENCE

The disclosure of the following priority application is herein incorporated by reference: Japanese Patent Application No. 2007-277699 filed Oct. 25, 2007.

BACKGROUND OF THE INVENTION

1. Field of the Invention

The present invention relates to a camera and an image recording program product.

2. Description of Related Art

Japanese Laid-Open Patent Application No. 2005-39365 discloses a camera which performs continuous shooting a predetermined number of times, selects an image in which there are a smallest number of subjects whose eyes are closed from the acquired images and records the selected image when a mode for detecting closed eyes is set and if a release-on is sensed.

SUMMARY OF THE INVENTION

The conventional digital camera has a problem in that even when a specified person whose picture a user wants to take is shot with his or her eyes closed to acquire an image, that image will be undesirably selected and recorded.

According to the first aspect of the present invention, a camera comprises: an image-capturing unit that captures images of a photographic subject by image sensors and creates image data of a plurality of shot images based on an instruction for continuous shooting by a user; an identification unit that performs, each time when image data of one shot image from among the plurality of shot images is created, a state judgment whether or not eyes of a person included in the photographic subject appearing in the one shot image are open and identifies image data of the one shot image as identified image data when a result of the state judgment is YES; and a recording unit that records the identified image data in a nonvolatile storage medium.

According to the second aspect of the present invention, in the camera according to the first aspect, it is preferred that, when the identification unit identifies the identified image data, the continuous shooting is subsequently stopped.

According to the third aspect of the present invention, in the camera according to the first aspect, it is preferred that the camera further comprises a designation unit that designates, before an instruction for the continuous shooting, at least one of the persons as a designated person based on an instruction by the user. The identification unit performs the state judgment whether or not eyes of the designated person are open.

According to the fourth aspect of the present invention, in the camera according to the third aspect, it is preferred that the camera further comprises a display unit that displays on a screen thereof a captured image captured by the image sensor. The designated person is determined by designation by the user of at least one of the persons who appear in the captured image.

According to the fifth aspect of the present invention, in the camera according to the second aspect, it is preferred that the identification unit recognizes an area in which a face of the person appears by face recognition processing in the one shot image and performs the state judgment whether or not eyes of the person are open in the area.

According to the sixth aspect of the present invention, in the camera according to the second aspect, it is preferred that the camera further comprises an evaluation image creation unit that creates image data for evaluation having a size smaller than that of an image data of the one shot image based on the image data of the one shot image. The identification unit identifies the identified image data using the image data for evaluation.

According to the seventh aspect of the present invention, in the camera according to the second aspect, it is preferred that the recording unit records an image file based on the identified image data in the nonvolatile storage medium when the identification unit identifies the identified image during the continuous shooting whereas the recording unit records in the nonvolatile storage medium an image file corresponding to at least one of the plurality of shot images recorded in a volatile buffer memory for which the result of the state judgment is NO when the identified image data is not identified by the identification unit during the continuous shooting.

According to the eighth aspect of the present invention, in the camera according to the seventh aspect, it is preferred that the camera further comprises a deletion unit that deletes an image file having a low priority from the buffer memory when the number of image files recorded in the buffer memory exceeds a predetermined number.

According to the ninth aspect of the present invention, a computer-readable computer program product contains an image recording program. The image recording program comprises: an image-capturing instruction to capture images of a photographic subject to create image data of a plurality of shot images based on an instruction for continuous shooting by a user; an identification instruction to perform a state judgment whether or not, each time when image data of one shot image among the plurality of shot images is created, eyes of a person included in the photographic subject appearing in the one shot image are open, and identifies the image data of the one shot image as identified image data when a result of the state judgment is YES; and a recording instruction to record the identified image data in a nonvolatile storage medium.

DESCRIPTION OF PREFERRED EMBODIMENTS

Figure 1:
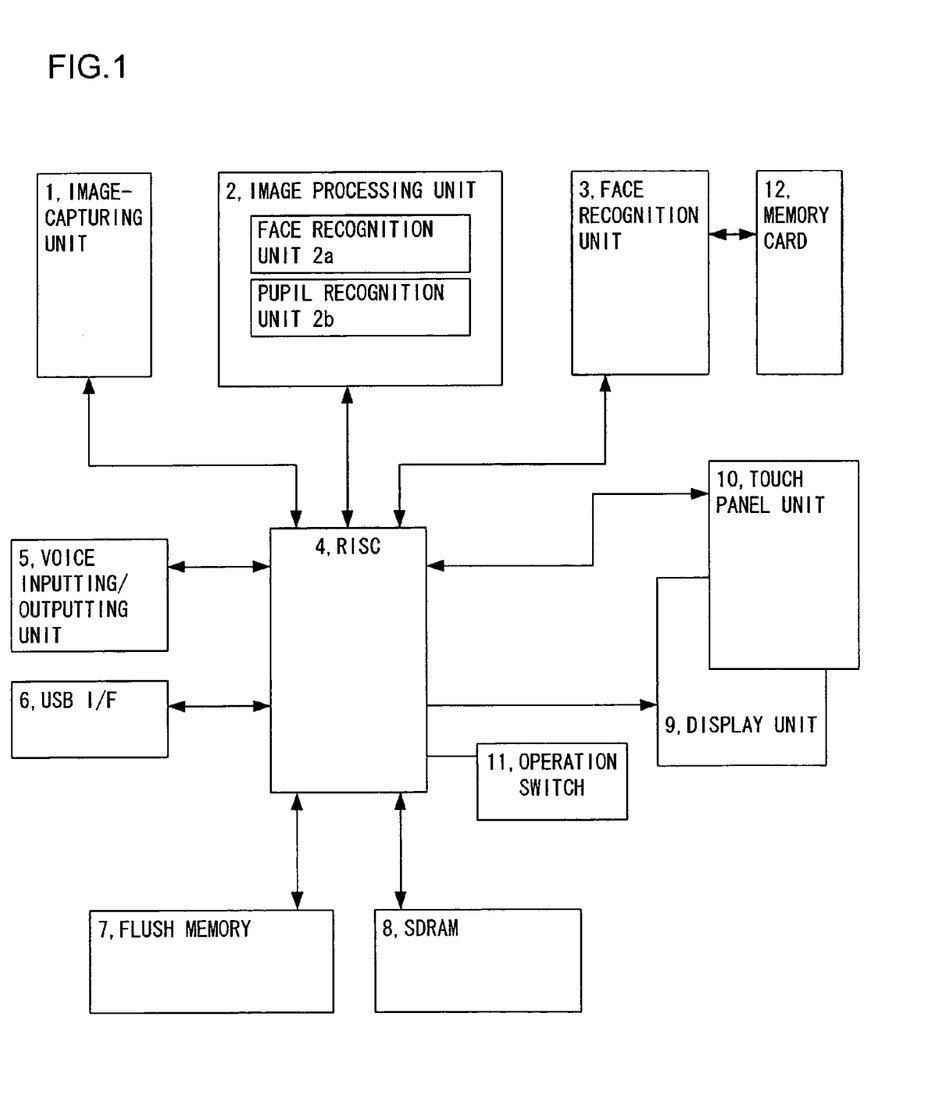
FIG. 1 is a block diagram presenting a configuration of a camera according to an embodiment of the present invention.

FIG. 1 is a block diagram presenting a configuration of a camera according to an embodiment of the present invention. A camera 100 includes an image-capturing unit 1, an image processing unit 2, a recording unit 3, RISC (Reduced Instruction Set Computer) 4, a voice inputting/outputting unit 5, a USB I/F 6, a flush memory 7, an SDRAM 8, a display unit 9, a touch panel unit 10, and an operation switch 11.

The RISC 4 controls each unit of the camera 100. The image-capturing unit 1 includes an imaging optical system constituted by a plurality of lenses and image sensors, such as, for example, CCDs or CMOS's. The image-capturing unit 1 performs A/D conversion of an image signal obtained by capturing by the image sensor a subject image input through the imaging optical system to form image data and outputs the obtained image data to the RISC 4. The RISC 4 records the image data input from the image-capturing unit 1 in the SDRAM 8 as a buffer memory detailed hereinbelow.

The image processing unit 2 performs various types of image processing on the image data recorded in the SDRAM 8. For example, it performs gradation correction processing and color conversion processing on the image data and then creates an image file of a predetermined image format, for example, of a JPEG format based on the processed data. The created image file is output to the recording unit 3 via the RISC 4. The image processing unit 2 includes a face recognition unit 2a and a pupil recognition unit 2b. The processing by the face recognition unit 2a and the pupil recognition unit 2b will be detailed later.

The recording unit 3 is a memory card slot that allows a nonvolatile external recording medium, for example, a memory card 12 to be removably loaded therein. The recording unit 3 records the image file created by the image processing unit 2 under a control by the RISC 4. The voice inputting/outputting unit 5 is constituted by a microphone for inputting voices and a speaker that outputs voices. The voice inputting/outputting unit 5 can take up external voices through the microphone and output operation sounds or warning sounds of the camera 100 through the speaker.

The USB I/F 6 is an interface for connecting the camera 100 to an external device through a USB cable. For example, by connecting the camera 100 to a PC (personal computer) through the USB I/F 6, the image file recorded in the memory card 12 can be fetched.

The flush memory 7 is a nonvolatile memory, in which data of a program to be executed by the RISC 4 and various parameters to be read in when the program is executed, and so on are recorded. The SDRAM 8 is a volatile memory, which is used as a working memory for expanding the program or as a buffer memory for temporarily recording the data when the CPU executes the program.

The display unit 9 is a liquid crystal monitor mounted in a digital camera 200. Various types of information, for example, images recorded in the memory card 12 and setting menu for setting the camera 100 are displayed on the display unit 9. The RISC 4 controls the image-capturing unit 1 to output images based on image data acquired by the image-capturing unit 1 in time-series as frames to the display unit 9. This causes the display unit 9 to display the frames output in time-series as time-series imagery in which each frame is displayed in series at a predetermined time interval. The time-series imagery is called a "view through lens" in monitor. That is, the display unit 9 displays a view through lens.

The display unit 9 has mounted thereon a touch panel unit 10. The user can operate the camera 100 by touching a screen of the touch panel unit 10 with a finger of the user or with a stylus. For example, when the display unit 9 displays a menu screen, the user can select an item by touching the item he or she wants to select in the displayed menu on the screen.

The operation switch 11 includes various inputting members to be operated by the user, for example, a power source button, a release button, a zoom button, a 4-way direction keypad button, an OK button, a cancel button, a menu display button, a replay button, a deletion button and the like.

The camera 100 according to the present embodiment has a mode for detecting closed eyes (hereafter, "closed-eyes-detection mode") as an operation mode of the 100. The RISC 4 controls the image-capturing unit 1 to continuously capture a plurality of images and identifies an image in which a person designated by the user is shot with his or her eyes open from among the plurality of images when the operation mode of the camera 100 is set to the closed-eyes-detection mode by the menu operation by the user. The RISC 4 controls the recording unit 3 so as to record the image file of the identified image to the memory card 12.

Figure 2A:
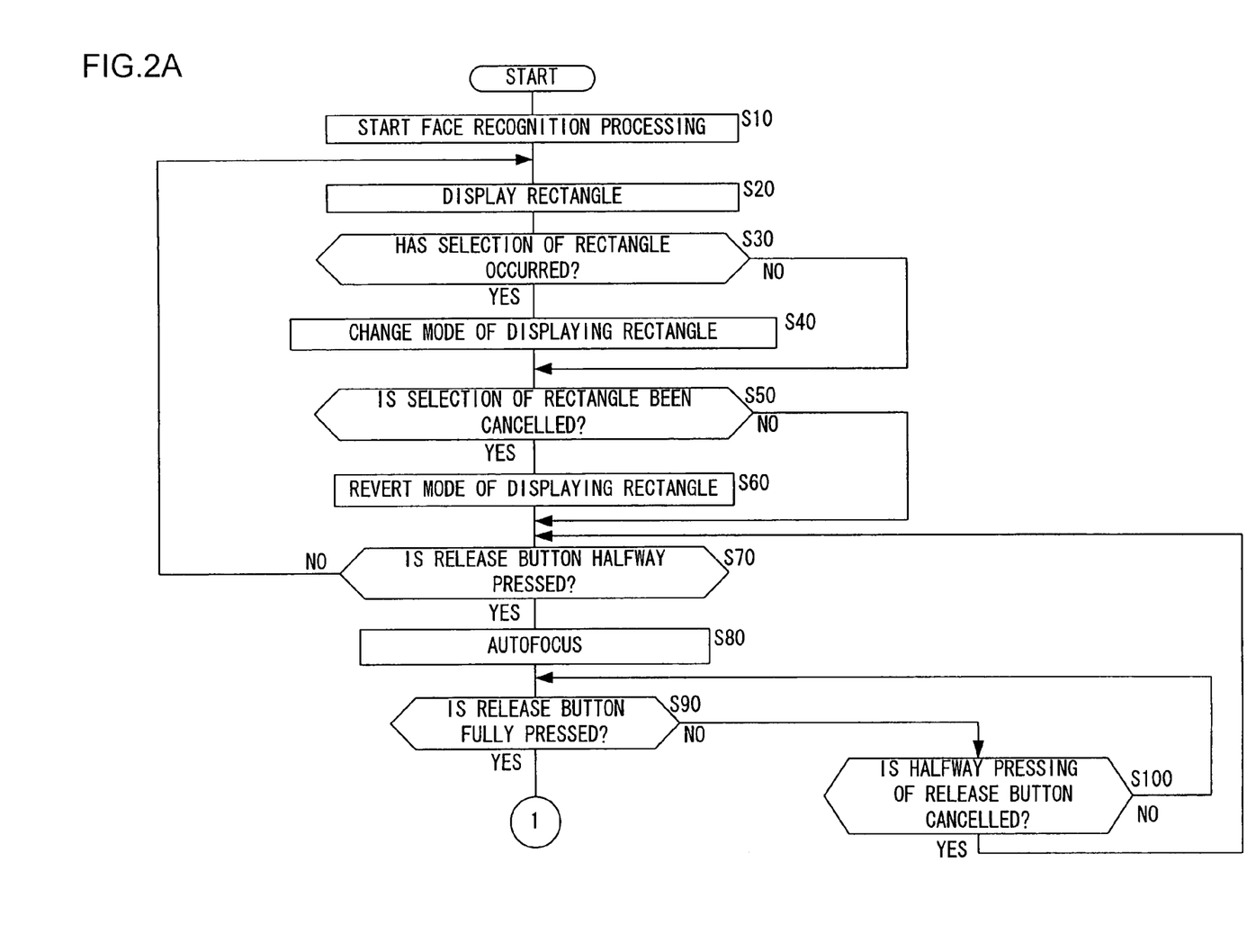
FIGS. 2A and 2B each are a flowchart illustrating processing to be executed by the camera according to an embodiment of the present invention.
Figure 2B:
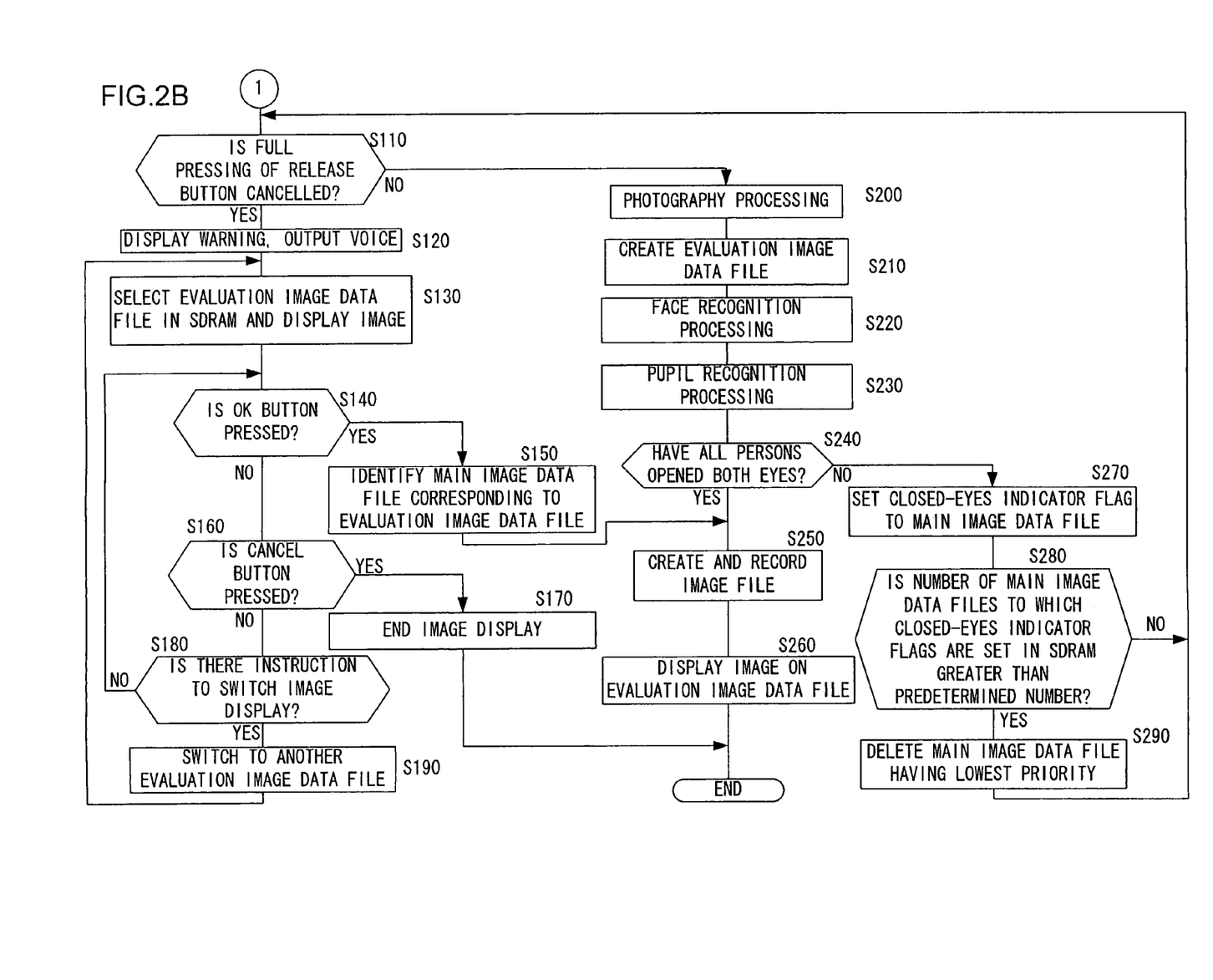

FIGS. 2A and 2B each are a flowchart illustrating the processing to be executed by the camera 100 according to an embodiment of the present invention. The processing shown in FIGS. 2A and 2B is executed by a program that is started up when the operation mode of the camera 100 is set to the closed-eyes-detection mode by the user. The program is recorded in the flush memory 7. In the present embodiment, it is assumed that a view through lens is displayed on the display unit 9 at the time when the processing shown in FIGS. 2A and 2B is started.

Figure 3:
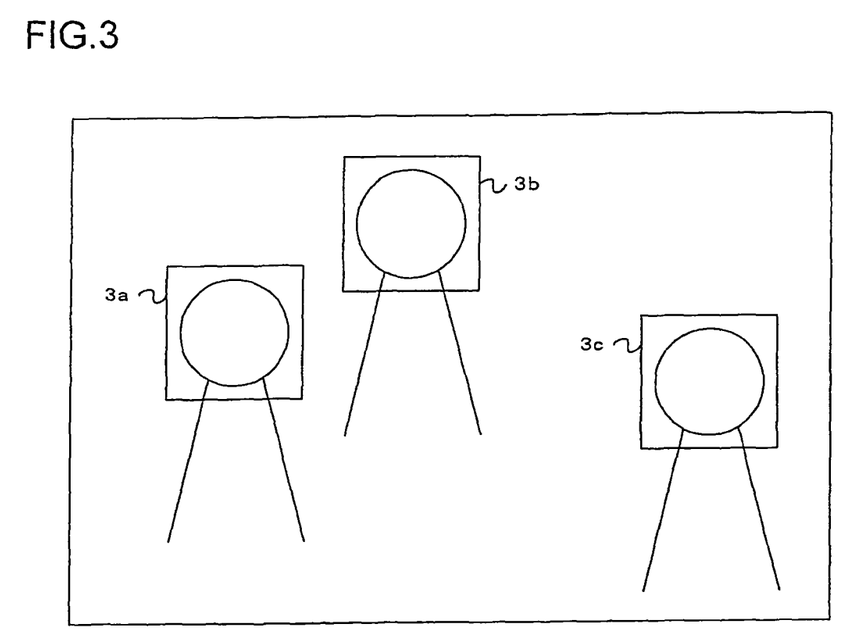
FIG. 3 is a diagram illustrating an example in which rectangles surrounding respective faces of persons detected by face recognition processing are displayed on a view through lens.

In a step S10, the face recognition unit 2a executes face recognition processing on image data of each of frames that constitute the view through lens to detect a face of a person who appears in the view through lens. The size of image data of the view through lens depends on the size of the screen of the display unit 9. In a step S20, the face recognition unit 2a displays the face of the person detected in the view through lens with a rectangle surrounding the face on the view through lens. For example, when three persons appear in the view through lens as shown in FIG. 3, rectangles 3a, 3b, and 3c with which the face recognition unit 2a has surround the faces of persons, respectively, are displayed on the view through lens. Since the face recognition processing is known in the art, detailed description thereof is omitted herein.

In a step S30, the RISC 4 judges whether or not at least one of the rectangles 3a, 3b, and 3c that are displayed on the view through lens is selected by the user. That is, the user can designate the rectangle that surrounds the face of a person whose eyes the user desires to be open upon shooting. For example, the user touches on the screen the rectangle that surrounds the face of the person whose eyes the user desires to be open upon shooting to designate the rectangle. If the result of the judgment in the step S30 is NO, the process is advanced to a step S50 while if the result of the judgment in the step S30 is YES, the process is advanced to a step S40.

Figure 4:
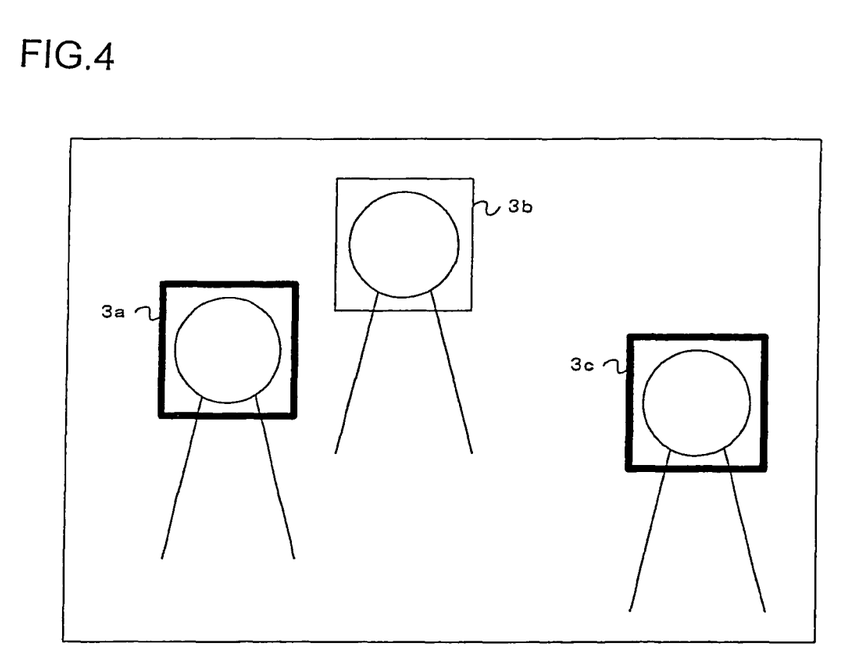
FIG. 4 is a diagram illustrating an example in which rectangles selected by a user is expressed in bold line.

In the step S40, the RISC 4 identifies the rectangle touched by the user based on the output form the touch panel unit 10 and changes a mode of displaying the identified rectangle. For example, the RISC 4 sets the color of display for a nonselected rectangle to green in advance and when the rectangle in green is selected by the user by touching it on the screen, the RISC 4 changes the color of display for the selected rectangle to red. Alternatively, the RISC 4 may change the mode of displaying the touched display by blinking it or by increasing a line thickness of the contour of the selected rectangle than that of the contour of the nonselected rectangle. FIG. 4 illustrates the example in which the selection of the rectangles 3a and 3c by the user changes the contours of the rectangles 3a and 3c into bold lines.

In the step S50, the RISC 4 judges whether or not the selection of the rectangle or rectangles has been cancelled by the user. The user can cancel the selection of the rectangle or rectangles by touching again the rectangle or rectangles that have been once selected. If the result of the judgment in the step S50 is NO, the process is advanced to a step S70 to be detailed later while if the result of the judgment in the step S50 is YES, the process is advanced to a step S60. In the step S60, the RISC 4 identifies the rectangle that has been touched again by the user based on the output from the touch panel unit 10 and returns the color of display or the mode of displaying the rectangle that has been touched again to the color of display or the mode of displaying the nonselected display.

In the step S70, the RISC 4 judges whether or not a release button included in the operation switch 11 has been halfway pressed by the user. If the result of the judgment in the step S70 is NO, the process is returned to the step S20. If the result of the judgment in the step S70 is YES, the process is advanced to a step S80. In the step S80, the RISC 4 controls the image-capturing unit 1 to execute an autofocusing processing to the face of the person surrounded by the rectangle that has been selected by the user on the view through lens to bring into focus the face of the person surrounded by the rectangle.

In a step S90, the RISC 4 judges whether or not the full pressing of the release button by the user has been cancelled. If the result of the judgment in the step S90 is NO, the process is advanced to a step S100 and the RISC 4 judges whether or not the halfway press of the release button by the user has been cancelled. If the result of the judgment in the step S100 is NO, the process is returned to the step S90. If the result of the judgment in the step S100 is YES, the process is returned to the step S70. If the result of the judgment in the step S90 is YES, the process is advanced to a step S110.

In the step S110, the RISC 4 judges whether or not the full press of the release button by the user has been cancelled. If the result of the judgment in the step S110 is NO, the process is advanced to a step S200. In the step S200, the RISC 4 controls the image-capturing unit 1 and the-image processing unit 2 to execute shooting processing to acquire a main image data file. The RISC 4 records the acquired main image data file in the SDRAM 8.

In a step S210, the RISC 4 controls the image processing unit 2 to create an image data file for evaluation that has a smaller image size than that of the main image data file based on the main image data file recorded in the SDRAM 8. The image size of the image data file for evaluation depends, for example, on the size of the screen of the display unit 9. The RISC 4 records the image data file for evaluation in the SDRAM 8.

In a step S220, the face recognition unit 2a executes face recognition processing on the image data file for evaluation recorded in the SDRAM 8 as a target to recognize the faces of the persons who appear in the image of the image data file for evaluation. In a step S230, the pupil recognition 2b executes pupil recognition processing on the area surrounded by the rectangle selected by the user in the step S30, which is the area containing the faces of persons, out of the faces of the persons recognized in the step S220 as targets. Since the pupil recognition processing is a conventional technology, detailed description thereof is omitted herein. The pupil recognition unit 2b detects the pupils of persons from an area that contains the faces of the persons by black-and-white pattern recognition, for example. If pupils are detected from the area that contains a face of a person, it is judged that the eyes of the person are open. On the other hand, if no pupils have been detected in the area, it is judged that the eyes of the person are closed, for example, due to blinking.

In a step S240, the RISC 4 judges whether or not both the eyes of each of all the persons that appear within the rectangles selected by the user are open based on the pupil recognition processing by the pupil recognition unit 2b. If the result of the judgment in the step S240 is YES, the process is advanced to a step S250, in which the RISC 4 controls the image processing unit 2 to create an image file (of a JPEG format) based on the main image data file recorded in the SDRAM 8. The RISC 4 controls the recording unit 3 to record the created image file in the memory card 12. In a step S260, the RISC 4 controls the display unit 9 to output the image data of the image data file for evaluation corresponding to the main image data file on which the image file recorded in the memory card 12 is based and to display an image. Then, the RISC 4 ends the process.

If the result of the judgment in the step S240 is NO, the process is advanced to a step S270. In the step S270, the RISC 4 sets, if there is at least one person whose eyes are closed among the persons appearing within the rectangles selected by the user, an indicator flag for indicating that there is a person whose eyes are closed (hereafter, "closed-eyes indicator flag") is set to the main image data file that is recorded in the SDRAM 8 in correspondence to the image data for evaluation.

In a step S280, the RISC 4 judges whether or not the number of main data files which are recorded in the SDRAM 8 and to which the closed-eyes indicator flag is set is greater than a predetermined number. The predetermined number is set in advance based on an available memory of the SDRAM 8. If the result of the judgment in the step S280 is NO, the process is returned to the step S110. If the result of the judgment in the step S280 is YES, the process is advanced to a step S290.

In the step S290, the RISC 4 deletes a main image data file to which priority is set lowest among those main image data files recorded in the SDRAM 8 and to which the closed-eyes indicator flag is set in order to increase the available memory of the SDRAM 8. Then, the RISC 4 returns the process to the step S110. For example, when the pupil recognition processing is executed by the pupil recognition unit 2b on faces of a plurality of persons surrounded by a plurality of rectangles selected by the user in the step S30, the RISK 4 assigns a lower priority to a main image data file corresponding to the image data file for evaluation shot when the eyes of more persons are closed, thereby deleting the main image data file. Alternatively, the RISK 4 deletes a main image data having an oldest shooting time by assigning a lowest priority to the main image data.

If there is even one person whose eyes are closed among persons surrounded by the plurality of rectangles selected by the user, the process is returned to the step S110. As a result the continuous shooting is executed until there is obtained an image shot when both the eyes of each of all the persons are open before the user cancels the full press of the release button and a judgment is repeatedly made as to whether or not both of the eyes of each of all the persons are open for each of the images. Unless the user cancels the shooting, an image shot when both the eyes of each of all the persons designated by the user are open can be acquired without fail.

If the result of the judgment in the step S110 is YES, the process is advanced to a step S120. As mentioned above, if it were judged that both the eyes of each of all the persons whose faces are surrounded by the rectangles selected by the user in the step S240 are open, the process should have been ended after the steps S250 and S260. However, the fact that the full pressing of the release button has been cancelled without end of the process means that there could be acquired no image shot when both the eyes of each of all the persons whose faces are surrounded by the rectangles selected by the user are open in the step S240.

Therefore, in the step S120, the RISC 4 outputs to the user a warning to notice that there could be obtained no image shot when both the eyes of each of all the persons whose faces are surrounded by the rectangles selected by the user are open. To be concrete, the RISC 4 controls the display unit 9 to display thereon a warning message or to let out a warning voice from a speaker contained in the voice inputting/outputting unit 5.

In a step S130, the RISC 4 selects one of the image data files for evaluation recorded in the SDRAM 8 as mentioned above and outputs the image data thereof to the display unit 9 to display the image. In the present embodiment, the user can select an image file of an image which the user desires to record and causes the recording unit 3 to record the image file in the memory card 12 when the image which the user desires to record is included in images shot when the eyes of any of the persons are closed.

To be concrete, when the user wants to select the image data file for evaluation corresponding to the image displayed on the display unit 9 in the step S130 as an objective to be recorded in the memory card 12, the user can instruct to select the image data file for evaluation as the objective to be recorded by pressing an OK button included in the operation switch 11. When a plurality of image data files for evaluation is recorded in the SDRAM 8, the user can switch the image data files for evaluation corresponding to the images displayed on the display unit 9 from one to another by operating a 4-way directional keypad button included in the operation switch 11. When no image data file for evaluation which the user wants to record in the memory card 12 is recorded in the SDRAM 8, the user can cancel recording of the image data file for evaluation in the memory card 12 by pressing a cancel button included in the operation switch 11.

In a step S140, the RISC 4 judges whether or not the OK button has been pressed by the user. If the result of the judgment in the step S140 is YES, the process is advanced to a step S150. In the step S150, the RISC 4 identifies a main data file that corresponds to the image data file for evaluation selected in the step S130 and then advances the process to the step S250 as mentioned above. If the result of the judgment in the step S140 is NO, the process is advanced to a step S160.

In the step S160, the RISC 4 judges whether or not the cancel button has been pressed by the user. If the result of the judgment in the step S160 is YES, the process is advanced to a step S170. In the step S170, the RISC 4 ends the output of the image data of the image data file for evaluation to the display unit 9 and ends the process. If the result of the judgment in the step S160 is NO, the process is advanced to a step S180.

In the step S180, the RISC 4 judges whether or not there has been an instruction to switch the image data file for evaluation corresponding to the image displayed on the display unit 9 by operation of the 4-way directional keypad button by the user. If the result of the judgment in the step S180 is NO, the process is returned to the step S140. If the result of the judgment in the step S180 is YES, the process is advanced to a step S190. In the step S190, the RISC 4 switches the image data file for evaluation corresponding to the image to be displayed on the display unit 9 to another image data file for evaluation recorded in the SDRAM 8.

According to the present embodiment as mentioned above, the following advantages can be obtained.

(1) The RISC 4 identifies a main image data file based on image data acquired by shooting when the eyes of a person as a photographic subject are open from among a plurality of main image data files acquired by continuous shooting by the image-capturing unit 1 and controls the recording unit 3 to record the identified main image data file in the memory card 12 serving as a nonvolatile recording medium. The RISC 4 is configured to end the continuous shooting when the main image data file is identified. This can avoid unnecessary shooting. Accordingly, the user can promptly perform next shooting while the camera 100 of the present embodiment can avoid useless consumption of power.

(2) The RISC 4 identifies a main image data file based on image data acquired by shooting when the eyes of a person as a photographic subject are open from among a plurality of main image data acquired by continuous shooting by the image-capturing unit 1 and controls the recording unit 3 to record the identified main image data file in the memory card 12 serving as a nonvolatile recording medium. The RISC 4 is configured to judge whether or not the eyes of a person whose face has been selected by the user on the view through lens are open. This makes it possible to acquire an image shot when the eyes of the person designated by the user are open without fail.

(3) The face recognition unit 2a executes the face recognition processing on the image data file for evaluation on the image data file to recognize the face of a person who appears in an image corresponding to the image data file for evaluation while the pupil recognition unit 2b judges whether or not the eyes of the person whose face has been recognized by the face recognition unit 2a are open. This makes it possible to restrict the range over which the pupil recognition unit 2b performs the pupil recognition processing to some extent and hence shorten a time required for the pupil recognition processing.

(4) The RISC 4 is configured to create an image data file for evaluation having an image size smaller than that of a main image data file based on the main image data file and use the image data file for evaluation to determine whether or not the eyes of the person who appears in an image corresponding to the image data file for evaluation are open. As a result, it is only necessary for the face recognition unit 2a and the pupil recognition unit 2b to execute the face recognition processing and the pupil recognition processing on image data files for evaluation each having an image size smaller than that of the main image data file, so that the time required for such processing can be shortened.

(5) The RISC 4 judges on an image corresponding to an image data file for evaluation recorded in the SDRAM 8 serving as a volatile buffer memory whether or not both the eyes of all the persons whose faces were selected by the user are open in the image. If no image data file for evaluation corresponding to the image shot when both the eyes of each of all the persons are open can not be identified, the main image data file corresponding to the image data file for evaluation selected by the user from among the main image data files recorded in the SDRAM 8 is recorded in the memory card 12 serving as a nonvolatile recording medium. This enables the user to select an image which the user wants to record in the memory card 12 from among the main image data recorded in the SDRAM 8 and record it in the memory card 12.

(6) The RISC 4 is configured to delete main image data files in the order of increasing priorities if the number of frames of main image data in the SDRAM 8 exceeds a predetermined number. This can reduce the memory usage of the SDRAM 8.

Note that the camera of the above-mentioned embodiment can be modified as follows.

(1) In the above-mentioned embodiment, explanation has been made on the following example. That is, the RISC 4 is configured to record a main image data file based on the image data acquired by controlling the image-capturing unit 1 in the SDRAM 8. If there is identified, as a result of pupil recognition processing on an image data file for evaluation by the pupil recognition unit 2b, even one person whose eyes are closed among persons surrounded by the plurality of rectangles selected by the user, a closed-eyes indicator flag indicating that there appears a person whose eyes are closed is set to the main image data corresponding to the image data file for evaluation. However, the RISC 4 maybe configured such that if there appears even one person whose eyes both are closed, the RISC 4 deletes the main image data file corresponding to the image data file for evaluation from the SDRAM 8.

(2) In the above-mentioned embodiment, explanation has been made on the following example. That is, the RISC 4 displays an image corresponding to the image data file for evaluation recorded in the SDRAM 8 on the display unit 8 and the user selects an image to be recorded when there could be acquired no image data by image-capturing when both the eyes of each of all the persons selected by the user are open. However, the RISC 4 may be configured to create image files based on image data files corresponding to all the image data for evaluation recorded in the SDRAM 8 and record them in the memory card 12 when there could be acquired no image data shot when both the eyes of each of all the persons selected by the user are open.

(3) In the above-mentioned embodiment, explanation has been made on the following example. That is, the RISC 4 is configured to delete main image data files with low priorities when the number of main image data files, to which closed-eyes indicator flags are set, respectively, recorded in the SDRAM 8 is greater than a predetermined number set in advance. On this occasion, the RISC 4 deletes the main image data files by setting lower priorities to main image data files corresponding to images shot when the eyes of more persons are closed or to main image data files having older times and dates of shooting. However, it may be configured such that when a rectangle surrounding the face of a person is selected on the view through lens, the user can set a different priority to the rectangle and set a lower priority to a main image data file corresponding to an image shot when the eyes of the person whose face is surrounded by a rectangle with a different higher priority are closed in order to delete the main image data file with a lower priority from the SDRAM 8.

For example, the RISC 4 sets the highest priority to the rectangle that the user selected first on the view through lens. When the number of main image data files, to which closed-eyes indicator flags are set, respectively, recorded in the SDRAM 8 is greater than a predetermined number set in advance, the RISC 4 deletes the main image data files corresponding to images shot when the eyes of the person whose face is surrounded by a rectangle with the highest priority are closed is deleted from the SDRAM 8.

(4) In the above-mentioned embodiment, explanation has been made on the following example. That is, the RISC 4 judges whether or not both the eyes of each of all the persons whose faces are surrounded by respective rectangles selected by the user are open each time when one of a plurality of main image data files to be created by repeating image data acquisition by image-capturing is created until the shooting is stopped when an image shot when both the eyes of each of all the persons are open is identified. However, the RISC 4 may be configured such that a plurality of frames of images is acquired in advance as main image data files, which are then recorded in the SDRAM 8. The RISC 4 identifies, from among the recorded main image data files, a main image data file corresponding to an image shot when both the eyes of each of the persons whose faces are surrounded by rectangles selected by the use reach are open. This enables execution of the judgment whether or not both the eyes of each of all the persons are open without stopping the continuous shooting by the image-capturing unit 1 when it takes a shorter time to shoot one frame of image by the image-capturing unit 1 than to perform processing of the judgment whether or not both the eyes of each of all the persons are open by the RISC 4 on one frame of image. Note that in the above-mentioned example, the main image data file recorded in the SDRAM 8 is made an objective for identifying the main image data file corresponding to the image shot when both the eyes of each of all the persons are open. However, the main image data file recorded in the memory card 12 may be made such an objective.

(5) In the above-mentioned embodiment, explanation has been made on the example in which the processing illustrated in FIGS. 2A and 2B is executed by the camera 100. However, the processing may be executed on a PC that has fetched therein an image file through a USB I/F 6. For example, a plurality of image files is recorded in a predetermined folder in a hard disk drive (HDD) of the PC through the USB I/F 6 in advance and the CPU of the PC executes the processing shown in FIGS. 2A and 2B to identify an image file corresponding to an image shot when the eyes of the person as a photographic subject are open from among the plurality of image files and then move or copy the identified image file to a separate folder.

Figure 5:
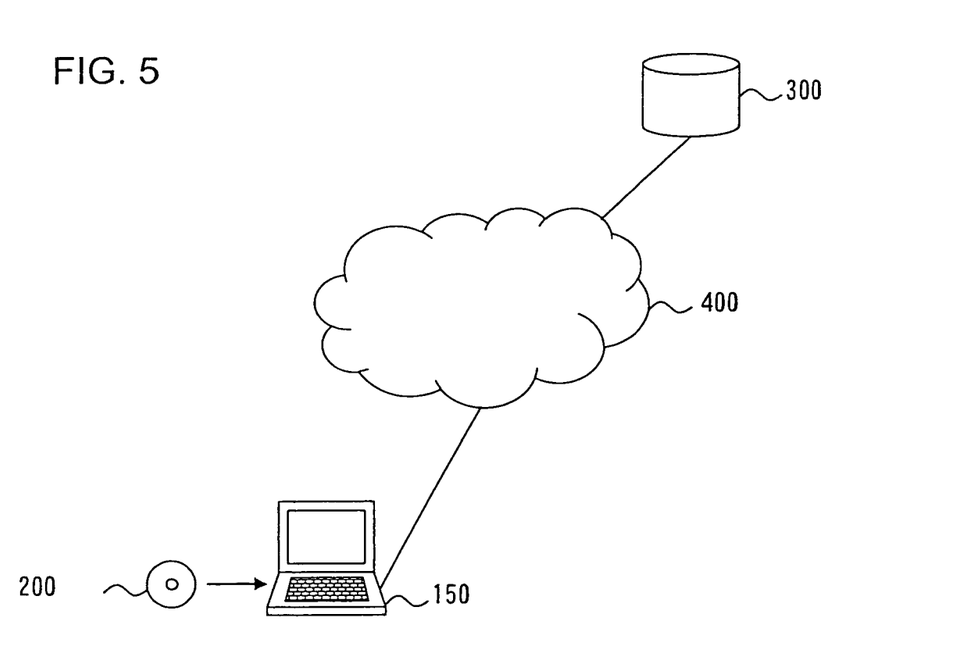
FIG. 5 is a diagram exemplifying a mode of supplying a computer program product that executes image recording according to an embodiment of the present invention.

An image recording program product according to which the CPU of a PC 150 executes the processing as shown in FIGS. 2A and 2B is supplied as a storage medium 200 (for example, CD-ROM) or data signals transmitted via a communication network 400 (for example, the Internet) as shown in FIG. 5. The PC 150 is supplied with a program for recording images through a CD-ROM 200. Alternatively, the program for recording images may be supplied in the following mode of supply. The PC 150 has a capability of being connected with the communication network 400. A server 300 is a computer that supplied the program for recording images. The server 300 stores the program for recording images in a storage medium such as a hard disk. The server 300 embodies the program for recording images that have been read out from the hard disk on a carrier wave as data signals to transmit the program to the PC 150 through the communication network 400. As mentioned above, it is preferred that the program for recording images is supplied in various forms of computer program products including supplying as the storage medium 200 and data signals via the communication network 400.

The above-described embodiments are examples, and various modifications can be made without departing from the scope of the present invention.

What is claimed is:

1. A camera comprising:
   An image-capturing unit that captures images of a photographic subject by an image sensor and creates image data of a plurality of shot images based on an instruction for continuous shooting by a user;
   a display unit that displays on a screen thereof a captured image that is captured by the image sensor;
   a designation unit that designates, before the instruction for the continuous shooting, at least one of the persons displayed on the screen of the display unit as a designated person based on an instruction by the user;
   an identification unit that performs a state judgment each time when image data of a one shot image of the plurality of shot images is created, of whether or not both eyes of the designated person appearing in the one shot image are open during the continuous shooting and identifies the image data of the one shot image with the designated person having both eyes open as identified image data when a result of the state judgment is YES; and a recording unit that records the identified image data in a nonvolatile storage medium, wherein when the identification unit identifies the identified image data, the continuous shooting is subsequently stopped.

2. The camera according to claim 1, wherein the identification unit recognizes an area in which a face of the designated person appears by face recognition processing in the one shot image and performs the state judgment whether or not the eyes of the designated person are open in the area.

3. The camera according to claim 1, further comprising:

an evaluation image creation unit that creates image data for evaluation having a size smaller than that of an image data of the one shot image based on the image data of the one shot image, wherein the identification unit identifies the identified image data using the image data for evaluation.

4. The camera according to claim 1, wherein the recording unit records an image file based on the identified image data in the nonvolatile storage medium when the identification unit identifies the identified image during the continuous shooting, whereas the recording unit records in the nonvolatile storage medium, an image file corresponding to at least one of the plurality of shot images recorded in a volatile buffer memory for which the result of the state judgment is NO when the identified image data is not identified by the identification unit during the continuous shooting.

5. The camera according to claim 4, further comprising:

a deletion unit that deletes an image file having a low priority from the buffer memory when the number of image files recorded in the buffer memory exceeds a predetermined number.

6. A non-transitory computer-readable computer program product containing an image recording program, the image recording program comprising:

an image-capturing instruction to capture images of a photographic subject by an image sensor to create image data of a plurality of shot images based on an instruction for continuous shooting by a user;

an identification instruction to perform a state judgment whether or not, each time when image data of one shot image among the plurality of shot images is created, both eyes of a designated person designated by the user appearing in the one shot image are open during the continuous shooting, and identifies the image data of the one shot image with the designated person having both eyes open as identified image data, the continuous shooting being subsequently stopped, when a result of the state judgment is YES; and a recording instruction to record the identified image data in a nonvolatile storage medium.

7. The camera according to claim 4, further comprising:

when the identification unit does not identify the image data of the one shot image as the identified image data before the continuous shooting is canceled, the display unit displays on the screen thereof the at least one shot image of the plurality of shot images, corresponding to the image file recorded in the volatile buffer memory; and when the at least one shot image of the plurality of shot images is selected by the user, the recording unit records the at least one shot image of the plurality of shot images.

* * * * *